(12) United States Patent
Guthrie

(10) Patent No.: US 6,745,996 B1
(45) Date of Patent: Jun. 8, 2004

(54) ALTERNATING PRESSURE VALVE SYSTEM

(75) Inventor: Brian L. Guthrie, Bradbury, CA (US)

(73) Assignee: Gaymar Industries, Inc., Orchard Park, NY (US)

(*) Notice: Subject to any disclaimer, the term of this patent is extended or adjusted under 35 U.S.C. 154(b) by 0 days.

(21) Appl. No.: 09/626,434

(22) Filed: Jul. 27, 2000

Related U.S. Application Data

(63) Continuation-in-part of application No. 09/123,621, filed on Jul. 28, 1998, now abandoned.
(60) Provisional application No. 60/053,999, filed on Jul. 28, 1997.

(51) Int. Cl.[7] ................................................ A61G 7/00
(52) U.S. Cl. ................ 251/129.04; 5/713; 137/624.12; 137/875
(58) Field of Search ....................... 5/706, 710, 713; 137/554, 624.12, 624.14, 872, 874, 875, 876; 251/129.04, 129.12

(56) References Cited

U.S. PATENT DOCUMENTS

| | | | | |
|---|---|---|---|---|
| 3,373,771 A | * | 3/1968 | Boyen | 137/875 X |
| 3,545,470 A | * | 12/1970 | Paton | 137/875 X |
| 4,197,837 A | * | 4/1980 | Tringali et al. | 5/713 |
| 4,935,968 A | * | 6/1990 | Hunt et al. | 5/713 |
| 4,944,060 A | * | 7/1990 | Peery et al. | 5/713 |
| 5,035,016 A | * | 7/1991 | Mori et al. | 5/713 |
| 5,183,077 A | * | 2/1993 | Keiper | 137/876 X |
| 5,235,713 A | * | 8/1993 | Guthrie et al. | 5/71 |
| 5,320,141 A | * | 6/1994 | Keiper | 137/875 |
| 5,502,380 A | * | 3/1996 | Sittler et al. | 137/554 X |
| 5,529,026 A | * | 6/1996 | Kurr et al. | 123/41.1 |
| 5,685,036 A | * | 11/1997 | Kopfstein et al. | 5/713 |
| 5,967,185 A | * | 10/1999 | Baruschke et al. | 137/625.29 |

* cited by examiner

Primary Examiner—Gene Mancene
Assistant Examiner—Eric Keasel
(74) Attorney, Agent, or Firm—Roach, Brown, McCarthy, Gruber, P.C.; Kevin D. McCarthy

(57) ABSTRACT

An alternating pressure valve system is provided comprising a blower with an air intake and an air outlet; a rotor valve assembly connected to the air outlet from the blower where the rotor valve assembly comprising: a housing with an air intake, a first air outlet, a second air outlet, and a circular chamber; and a wedged shaped rotor valve rotatably contained within the circular chamber of the housing such that the rotor valve can rotate to partially block the first air outlet, partially block the second air outlet, or block neither air outlets; The rotor valve is preferably controlled by a gear-motor and pressure sensors to detect the relative pressure in each outlet.

17 Claims, 9 Drawing Sheets

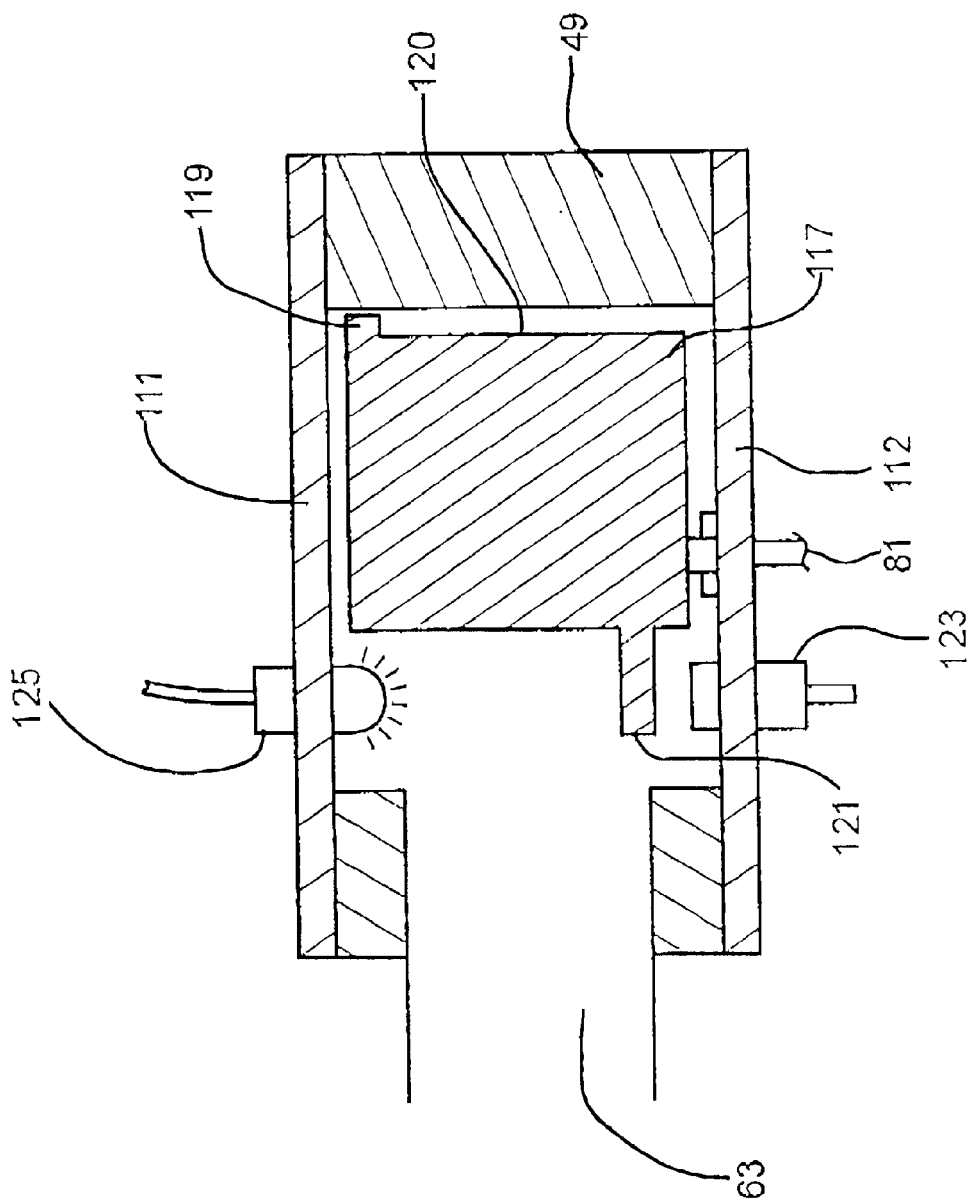

ALTERNATING PRESSURE VALVE SYSTEM

RELATED APPLICATIONS

The present applications claims the benefit of U.S. Provisional Patent Application Ser. No. 60/053,999, entitled "Alternating Pressure Valve System," filed on Jul. 28, 1997 and is a Continuation-in-Part of U.S. patent application Ser. No. 09/123,621 entitled "Alternating Pressure Valve System," filed on Jul. 28, 1998 now abandoned.

FIELD OF THE INVENTION

The present invention is generally related to an alternating pressure valve system for supplying fluid to an alternating pressure air mattress.

BACKGROUND OF THE INVENTION

Air mattress systems help prevent "bed sores" from developing in patients who are confined to laying on a mattress for long periods of time. The skin "interface pressure" tends to be much less because the patient is supported by a greater area than on a conventional mattress, so the blood supply to the skin is much improved. This therapy is further improved by the technique of "alternating pressure", whereby the alternate air sacks of the mattress are inflated to a different pressure. The goal is to reduce the support pressure at half of the air sacks, while supporting the patient on the other half of the air sacks which are inflated. After a period of time, the configuration of deflated and inflated air sacks is switched, which means the patient is never supported at one place for an extended period of time. The alternating therapy allows for the skin that was under pressure to recover, have increased blood flow through the skin, and allows air to dry the skin, all of which helps to prevent skin ulcers.

There are many alternating air pressure systems on the market today. Many of these systems are very complex and expensive. Typically, one half of the air sacks are inflated by a blower. After a period of time, solenoid valves open to release the pressure and air is then blown into the other half of the air sacks with its solenoid valves shut. Again after a period of time, the solenoid valves open to release the pressure and the first half of the air sacks are reinflated.

The alternating pressure systems are typically complex and fairly expensive. What is needed therefore is an inexpensive simple alternating pressure system which alternates air in the different halves of the air sacks. What is also needed is an alternating pressure system that allows for alternating pressure while allowing for air flow in all the air sacks of the mattress.

SUMMARY OF THE INVENTION

The present invention accomplishes the objectives of alternating pressure by the use of a motor-driven rotor valve within a valve assembly.

The valve assembly as constructed has many important features. First, the valve is in the air discharge path from the blower, but prior to the mattress. Second, the valve has one inlet port to receive blower air, and two outlet ports to send the air on to the mattress through hoses. Third, the valve has a rotor with a wedge-shaped section that forms a type of shutter when positioned over a port leading to the mattress, thereby restricting the air flow through that port only. Fourth, the wedge feature can be positioned between the ports so as to restrict neither one, the mattress then being inflated to that same pressure over the entire surface. This mode is sometimes desired. Fifth, the rotor and wedge turn within a cylindrical cavity, but without touching the wall. Sixth, the rotor is supported by and rotated by a gearmotor shaft. Seventh, the rotor is positioned optically by means of light sensors. Eighth, the gearmotor is a DC motor and driven by a H-bridge circuit to allow reversing at the end of each cycle. Ninth, the cycle time in the preferred embodiment is about 3 minutes. And, tenth, the transit time (during which the rotor moves through about 120 degrees) is about 4 seconds.

BRIEF DESCRIPTION OF THE DRAWINGS

The understanding of the present invention will and the various aspects thereof will be facilitated by reference to the accompanying drawing figures, submitted for illustration only and not to limit the scope of the invention, where similar reference numerals are used for similar elements in the respective drawings, on which;

FIG. 7 is a cross-sectional view of an alternate valve assembly illustrating light sensors of the present invention;

DETAILED DESCRIPTION OF THE PREFERRED EMBODIMENTS

Figure 1:
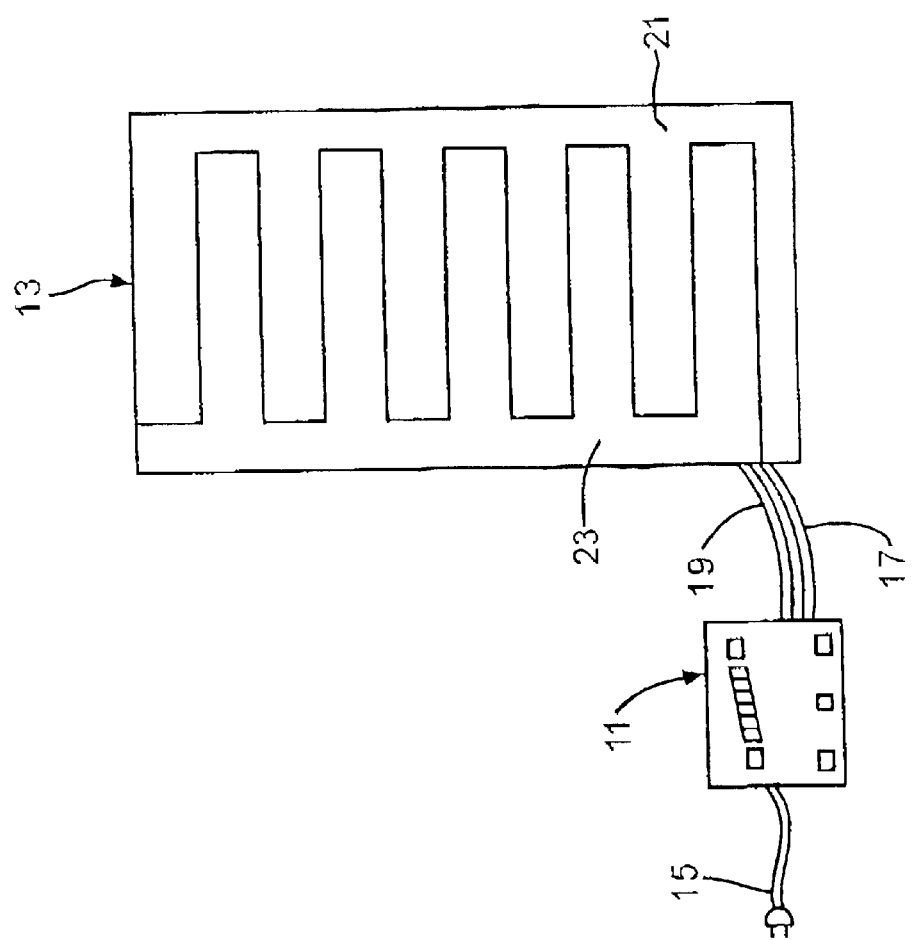
FIG. 1 is a schematic plan view of an alternating pressure mattress and blower.

The present invention provides an alternating pressure valve system for controlling the supply of fluid to an alternating pressure mattress. As used herein, like reference numerals will designate similar elements in the various embodiments of the present invention. Referring now to FIG. 1, an alternating pressure supply 11 of the present invention is illustrated. The alternating pressure supply is connected to an alternating pressure mattress 13 via two hoses 17 and 19. Hose 17 supplies fluid to chambers or sacks 21 of the mattress and hose 19 supplies fluid to chambers or sacks 23 of the mattress. Usually, the fluid supplied to the mattress is air, which is compressible and helps to prevent high pressure points on a patient's skin. The mattress is preferably a low air loss mattress which deflates upon cessation of the supply of air to the mattress. This can be accomplished by providing tiny holes to the air chambers or sacks to allow air to flow out of the holes. The loss of air helps to dry the patient's skin and helps to prevent ulcers. The alternating pressure supply is connected to a conventional AC power outlet via cord 15. By alternating the pressure within the chambers of the mattress, the skin of a patient is never subjected to continuous high pressure points.

Figure 2:
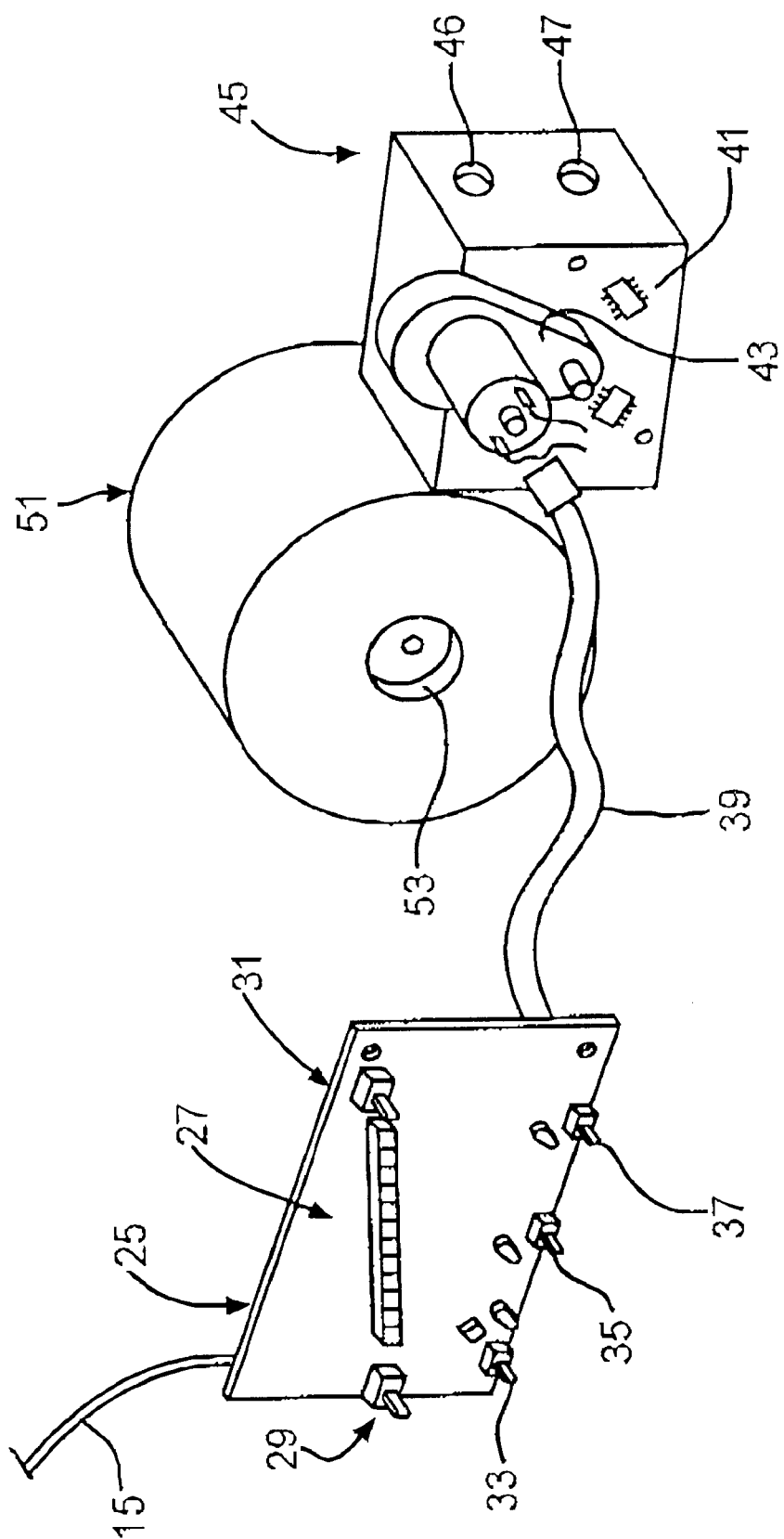
FIG. 2 is a schematic perspective view of the blower of the present invention

Turning now to FIG. 2, the alternating pressure supply is better illustrated. The alternating pressure supply is enclosed in a housing, not illustrated, that allows for air flow into the blower 51 and for the connection of the hoses to the air outlets 46 and 47. The blower receives air from a circular air intake 53. The front of the housing is a main control printed circuit board 25 with a LED bar graph 27 that indicates the relative pressure inside the mattress, a switch 29 to lower the pressure inside the mattress, a switch 31 to increase the pressure inside the mattress, a on/off/standby switch 33, a switch 35 to turn on the alternating pressure and a switch 37 to turn on maximum inflation of the air cells. The pressure inside the mattress is controlled by the relative speed of the blower 51. The preferred blower is a Wind Jammer™ 2 stage variable speed blower manufactured by Ametek™, however other conventional blowers can also be used. The faster the blower is moving fluid through the outlet hoses, the higher the pressure inside the mattress. Conversely, the slower the blower is moving fluid through the hoses, the lower the pressure inside the mattress. By having a variable speed blower that is controlled by the switches on the main control board, the speed of the blower is regulated and thus the pressure inside the mattress is regulated.

A cable 39 connects the main control board to a valve housing printed circuit board 41. As will be better described below, this board receives feedback from detectors in the housing as to the position of a rotor valve and controls the position of the rotor valve through controlling a gearmotor 43. The gearmotor is an alternating 12 volt nominal DC motor, 800 I series manufactured by Craemer, however, other motors such as other DC motors by different manufacturers and stepped motors could be used. The gearmotor controls move a rotor valve within the valve housing. Attached to one end of the valve housing is the blower 51. The other end of the valve housing has air outlets 47 that are threaded and receive hose connectors. The valve assembly 45 comprises the valve housing, the circuit board, the gear motor, and a cover plate 65 (illustrated in FIG. 3).

Figure 3:
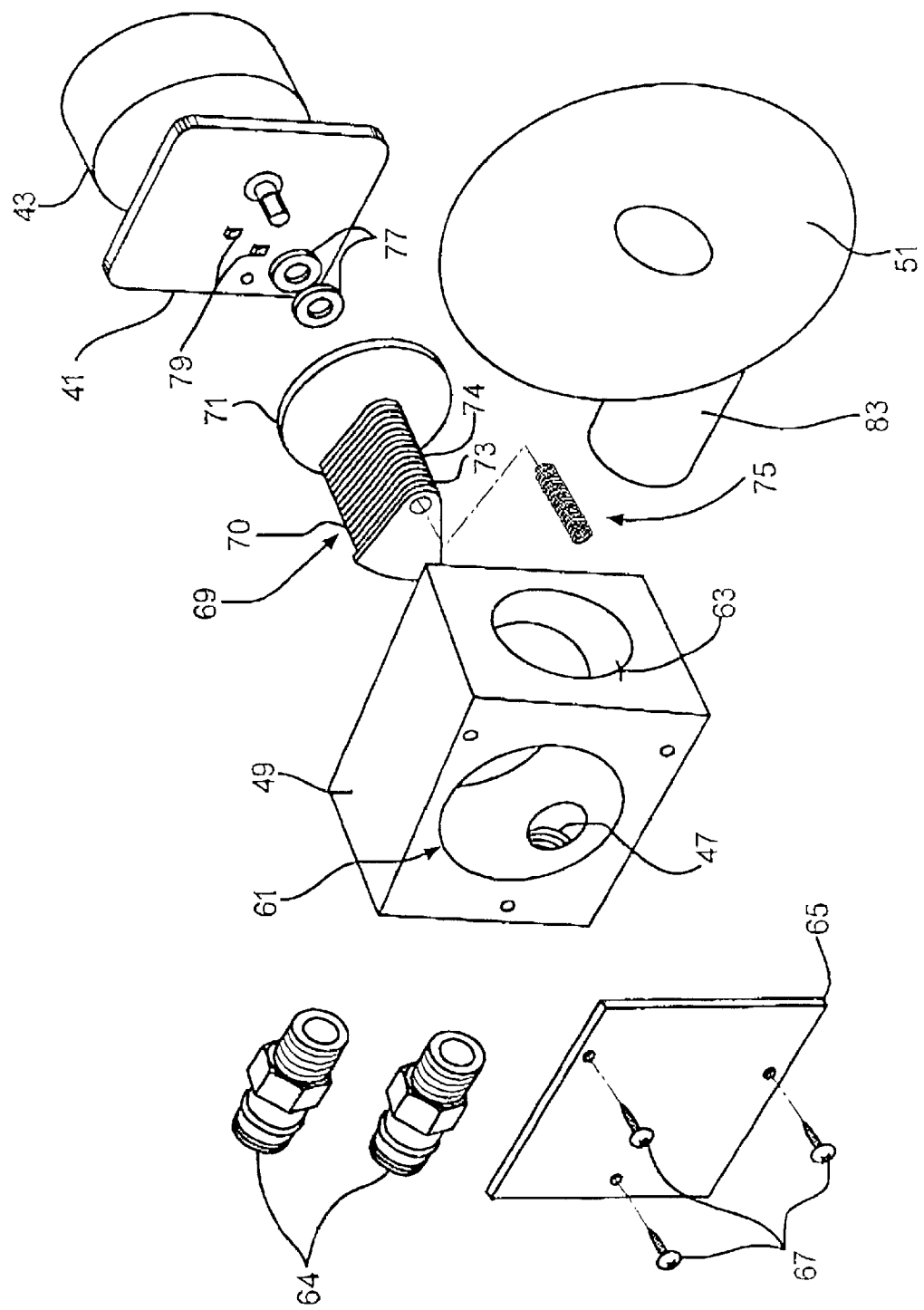
FIG. 3 is an exploded view of the alternating pressure rotor valve.

Turning now to FIG. 3, an exploded view of the valve assembly, the valve housing is rectangular in shape with a first end with an air inlet 63 for receiving air from the blower's air output 83, a second end for receiving hose connectors 64, a solid top and bottom surface, and two side surfaces that form the rotor valve cylinder 61. The housing is made out of a plastic material, preferably white Delrin™, however other plastics, acrylics, metals, etc. could be used. Currently the housing is machined with the following dimensions: height 2.35 inches, length 3.2 inches, depth 1.5 inches, air inlet diameter 1.25 inch, rotor valve cylinder radius 1.05 inches, air outlet radius 0.25 inches, however other dimensions could be used or the housing could be molded. A cover plate 65 is attached to one side of the housing using screws 67. Currently the cover plate is made from steel, however other materials could be used. Optionally, a gasket can be placed between the air inlet of the housing and the air output of the blower to ensure a good seal.

Inside the rotor valve cylinder is a rotor valve 69. The rotor valve is a wedged shaped valve that has a top 73 sized to just fit inside the valve cylinder (currently a radius just slightly less than 1.05 inches). The remaining portion of the valve shaft 70 is sized 0.020 less than the top (currently a radius of 1.03 inches). This differential in size creates a 0.020 gap between the outer edge of the wedge shaped valve and the inner wall of the valve cylinder. This gap allows for some air to flow past the valve and into an air outlet that the valve is covering up. In this way the flow of air is never entirely halted in any of the chambers of the air mattress when the controller is supplying alternating pressure to the mattress. If one wanted to completely block the air supply to the air chambers via the valve, then the valve body would have the same radius as the valve top.

The bottom of the valve is a bottom circular plate 71 that just fits inside the valve cylinder. At the center of the valve top's radius, a spring cylindrical recess 74 is provided that houses a spring 75 that keeps the valve from rubbing against the cover plate. At the bottom of the valve circular plate is a "D" shaped aperture 91 (see FIG. 4) that receives a "D" shaped drive shaft 81 of the gearmotor 43. Two brass washers 77 are provided between the bottom circular plate and the "D" shaped drive shaft. The valve housing printed circuit board 41 is the cover plate for the valve housing side that contains the gear motor. On the surface of the circuit board that faces the interior of the valve housing are two infrared light detectors/emitters 79. The detectors/emitters are located at two different radii from the drive shaft, currently one is placed at 0.95 inches and the other is placed at 0.75 inches. The detectors/emitters currently used are part no. OR520 from Omron™, however other standard detectors/emitters could be used. The circuit board is attached to the housing via screws (not illustrated).

Figure 4:
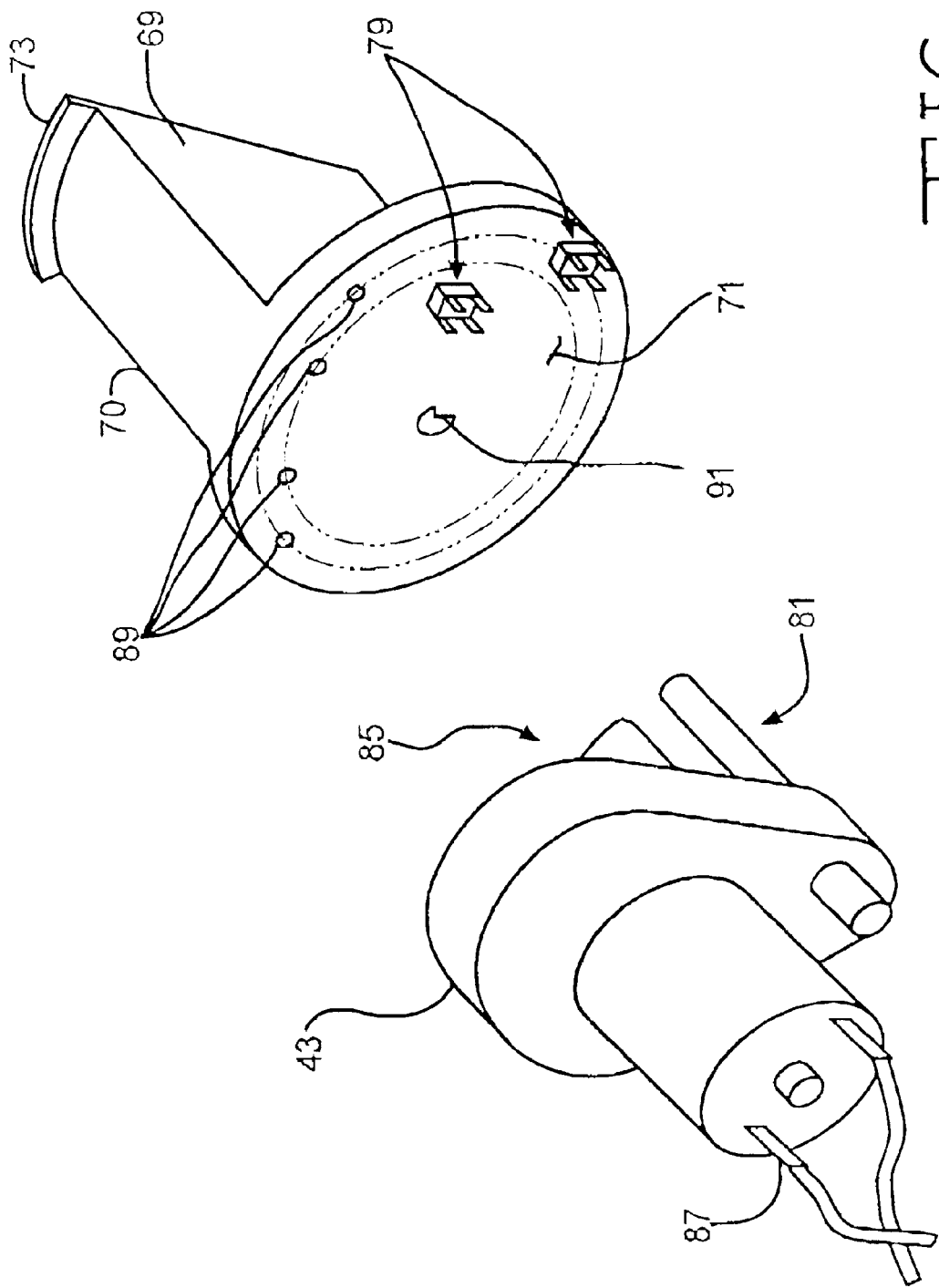
FIG. 4 shows the gearmotor and rotor valve of the present invention.

FIG. 4 illustrates the gearmotor, the rotor valve, and the positions of the infrared detectors/emitters. The rotor valve is preferably made out of a low reflective material such as black Delrin™. Located on the bottom surface of the rotor valve bottom are a plurality of circular recesses 89 (currently four recesses). The recesses are placed at two different radii from the center of the valve bottom to correspond with the radii of detectors/emitters. The recess are filled with a white high-gloss paint that reflects infrared light. Thus, depending on the location of the rotor valve, the feedback provided by the detectors/emitters to the circuit board will vary to indicate the correct valve position (see description for FIG. 6 below.)

Figure 5:
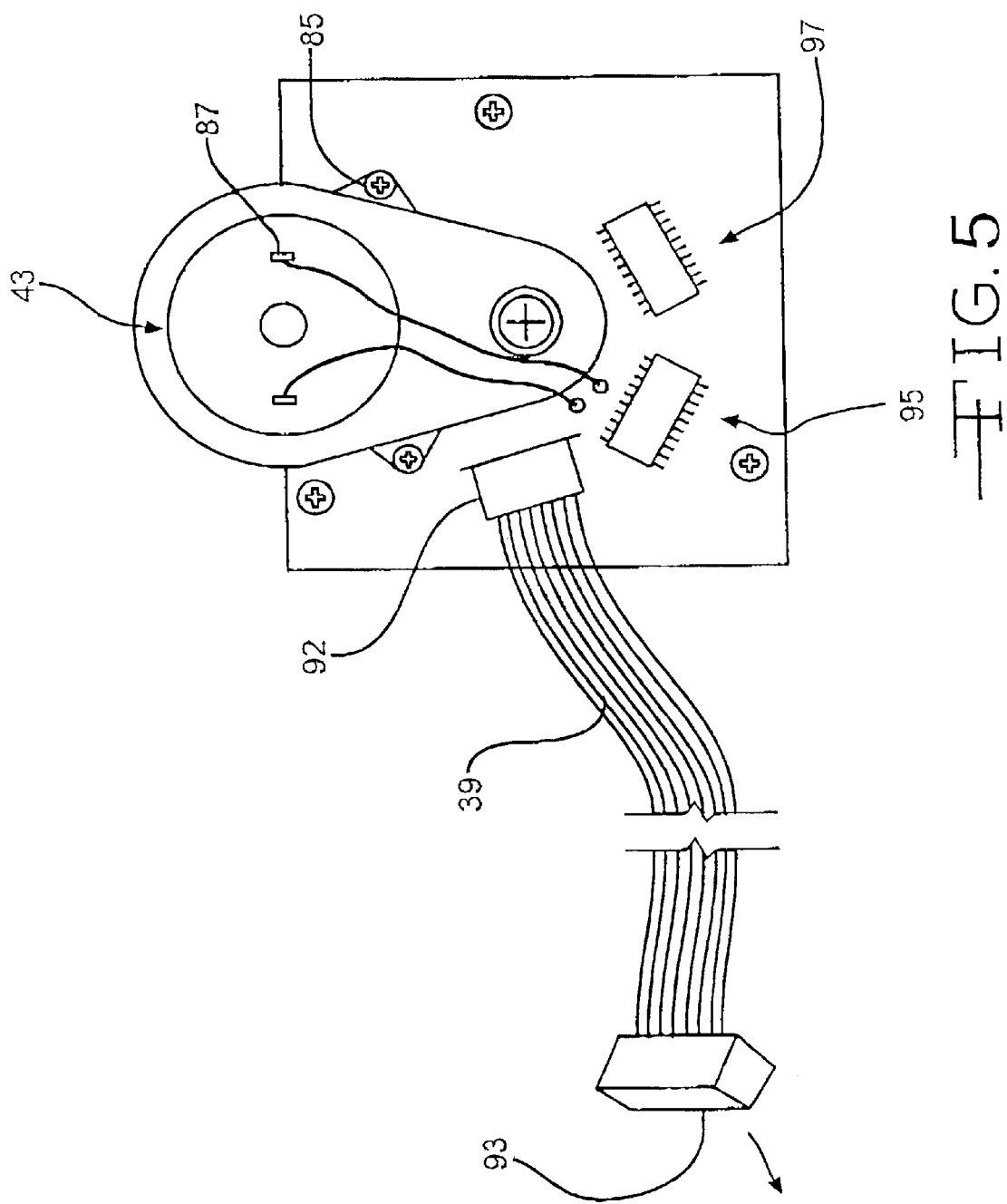
FIG. 5 is a side view of the gearmotor and printed circuit board of the present invention.

Turning now to FIG. 5, the valve circuit board and gearmotor are further illustrated. The circuit board has a signal buffer 95 (74 HC04) and a 2-to-4 decoder 97 (74 HC139) attached to its outer surface. The gear motor is attached to the circuit board via screws and mounting tabs 85. On the side of the circuit board facing the interior of the valve housing the detectors/emitters are mounted at their corresponding different radii. A cable 39 is attached to the circuit board via connectors 92 and 93. The cable carries signals to and from the main control board. The gearmotor is a DC reversible motor. The motor will not run if there is no current provided to the leads 87 of the gearmotor or if the same current is provided to each lead. The gearmotor will operate if current is provided to one lead and the other lead is grounded, and will reverse directions when the current and ground are reversed.

Figure 6C:
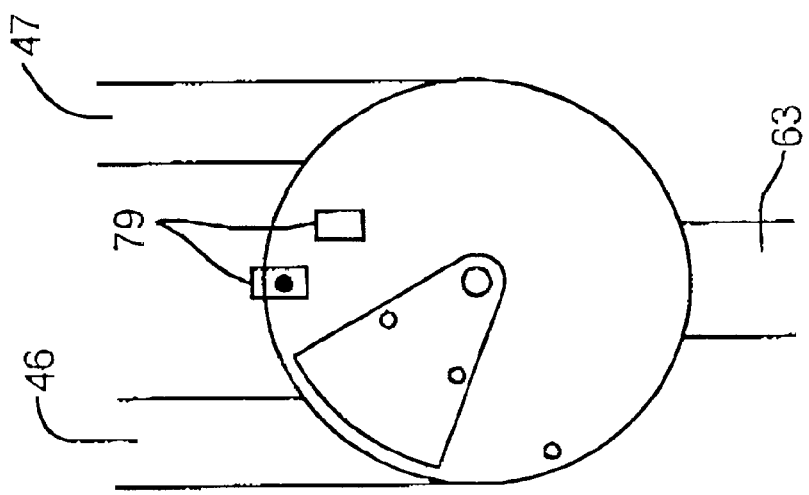
FIG. 6C is a schmatic view of the rotor valve shutting off air from the second air inlet and allowing air to flow through the first air inlet.
Figure 6B:
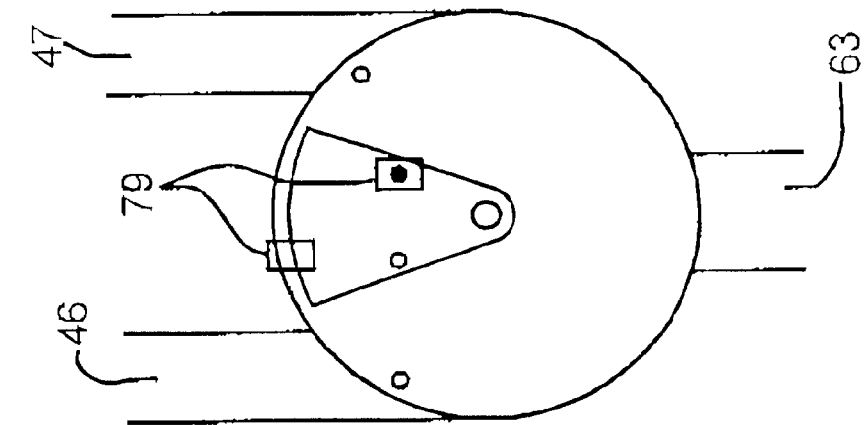
FIG. 6B is a schematic view of the rotor valve allowing air to flow through both air inlets.
Figure 6A:
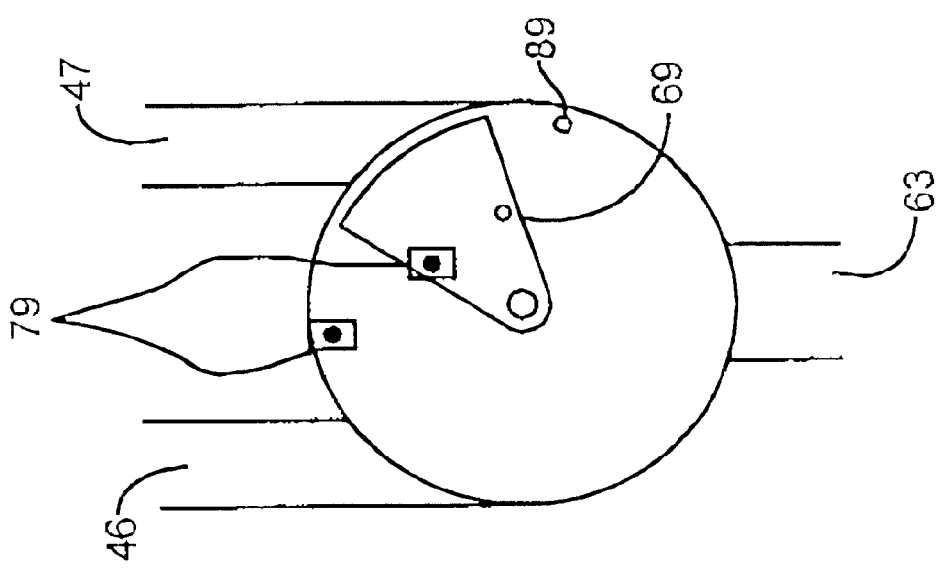
FIG. 6A is a schematic view of the rotor valve

FIGS. 6A–6C illustrates the sensing provided by the two detectors/emitters. When the wedge shaped valve is located −60 degrees from the axis of the air intake 63, the right air outlet 47 is covered by the valve restricting its air flow and thus reducing the corresponding pressure in the air chambers of the mattress connected to that outlet (see FIG. 6A). The infrared light being emitted by the detectors/emitters will then reflect off of the white paint within two recesses and both detectors/emitters will detect the light and transmit a signal to the circuit board.

Turning now to FIG. 6B, when the valve is centered along the air inlet axis, neither air outlet is covered, thus air can freely flow into both chambers of the mattress. This is the initial position of the valve such that the air mattress gets inflated quickly to support the patient. In this position, only one of the detectors/emitters detects infrared reflection, in the present invention the one that was set at the largest radius.

Finally, when the rotor valve is rotated +60 degrees from the air intake axis the left air outlet 46 is covered by the rotor valve (see FIG. 6C) and most of the air flows through air outlet 47. In this position, the opposite detector/emitter from FIG. 6B detects reflected infrared light, in this case the one placed on the smallest radius. Thus, the signals generated by the detectors/emitters signal varies dependent upon the position of the rotor valve.

The following describes the alternating pressure ("AP") control circuit of the present invention:

1. AP Switch and APsel Signal

The AP switch, when pressed, charges a 0.1 μF capacitor through a 10K resistor for debounce, then the signal is cleaned up with an HC-14 inverter (U9), and finally toggled by an HC73 flip-flop (U8). The Q-bar output is "anded" in an HC08 AND gate (U10), with a signal from another HC08 AND gate (U12) that is high only when the blower is running, and MAX INFLATE is OFF. The resulting signal from the AND gate is named AP ENABLE, which means "OK to run the AP system". AP operation is canceled when the system is in STANDBY or MAX INFLATE mode. AP function will resume, if previously activated, upon cancellation of MAX INFLATE.

2. Sensor Signals

The two sensors on the AP circuit board are positioned to face the back of the rotor, which has four reflective spots on it. The sensors each emit an infrared light, and have transistors that conduct when the light is returned by the presence of a reflector. The sensors are at two different radii, as are the reflective spots. The relationship between sensors and reflectors are such that the three parking positions of the rotor conform to three of the four binary combinations. The de-coding of the binary sensor data is performed by a HC139 on the AP unit's PCB. The output signals are buffered by an HC04, on the same board. These signals from the AP valve assembly are buffered by HC14 Schmidtt trigger invertors, so the resulting output is high when the sensor isn't illuminated. A "low" output is considered to mean that the rotor is in position over its sensor. There can be only one sensor output "low" at a time.

The position signals are named. SenA "low" means the rotor is covering one of the ports, called port 1. SenB low means that the rotor is midway, or parked, between the ports. This is the non-AP position. SenC low means the rotor is covering the other port, called port 2.

3. Trigger

The trigger signal changes state when the rotor moves over or away from one of the 60 degree limit sensors. Signals SenA and SenC are "ANDED" to derive Trig. When these signals are both high, this means that the rotor is not over either port. The use of a 74HC08 AND gate provides a "low" output whenever the rotor moves so that it covers either port. This signal is inverted and delayed to allow data to settle at another I.C. This delayed signal is again inverted, so it also goes "low" when the turning rotor arrives over either port. Trig is used to initiate the timing sequence, which in effect disables the motor until the timer completes its cycle. Trig is also used to clock in the data that sets the motor terminal polarity. The operation is: Position signal SenC goes low, then the rotor moves from port I towards port2. When it arrives over port 2 Trig goes "low", which starts the motor-disable timer (see below). This signal also clocks in the new motor polarity data from signals SenA and SenC. When the timer commands the motor to run again, it will be in the opposite direction.

4. Timer

The timer signal is the output from the HC221, section B. This signal is combined into the motor drive signal (see below).

5. Motor Drive Signal

The electric motor is disabled or enabled by this signal. This signal is a logical combination of APsel, SenB, and Timer. SenB and APsel are "ORED" together so that when AP is turned off (APsel goes low) the motor will turn the rotor until the center position sensor (SenB) goes low. These two low signals result in a low output, "ANDED" with the Timer signal, that shuts off power to the motor by disconnecting the ground connection.

AP MODE, SEQUENCE OF EVENTS

1. Initial-system running in normal mode; non-MAX INFLATE.

2. AP Key pressed. Debounced output goes low.

3. FF "a" toggles. Output "Q" goes low, illuminating AP system LED.

4. FF "a" output "Q bar" goes high. This is "ANDED" with U5-4; high when MAX INFLATE is off. "ANDED" output goes high; signal name is "AP enable".

5. "AP enable" connects to U5-11, the reset of one-shot section "b". With reset removed, this one-shot timer is ready to start.

6. "AP enable" is "Ored" with "SenB" (the signal from the mid position rotor sensor). "SenB" is low because the rotor is parked over it.

Currently, the AP circuit provides for 4 seconds of movement of the rotor valve from one side to the other, and then three minutes of no rotor valve movement until the rotor valve reverses to the other side. The three minute timing is currently preferred, however other timing from 0 seconds (constantly reversing pressure) to about five minutes of no valve movement is recommended for use depending on the patient's needs and condition. As would be recognized by a person skilled in the art, other timing sequences could also be used.

Figure 9:
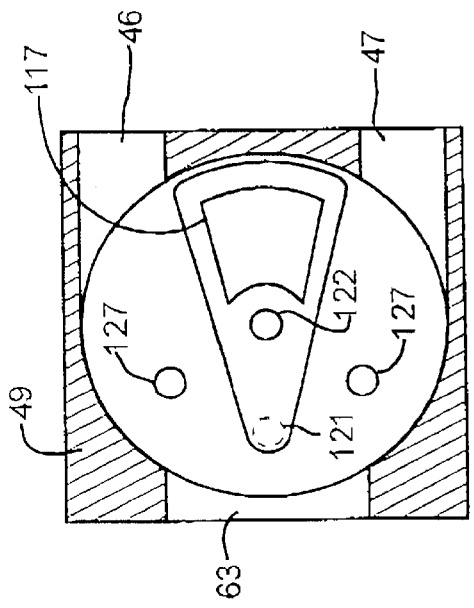
FIG. 9 is a top view partially in cross-section of the alternate valve assembly with the rotor valve allowing air to flow through both air inlets.
Figure 10B:
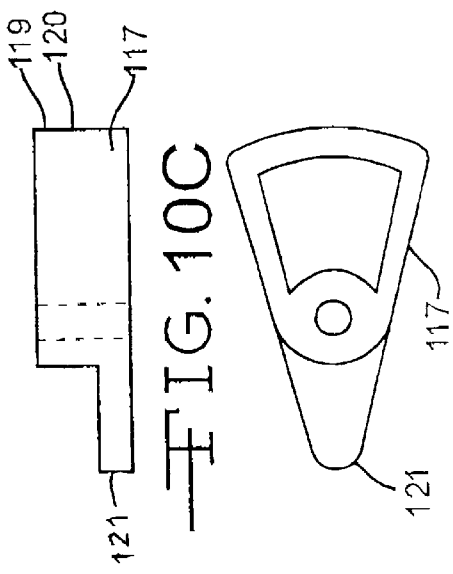
FIG. 10B is a top view of an alternate rotor valve.
Figure 10C:
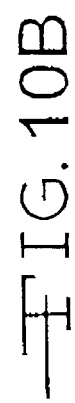
FIG. 10C is a side view of an alternate rotor valve.
Figure 8:
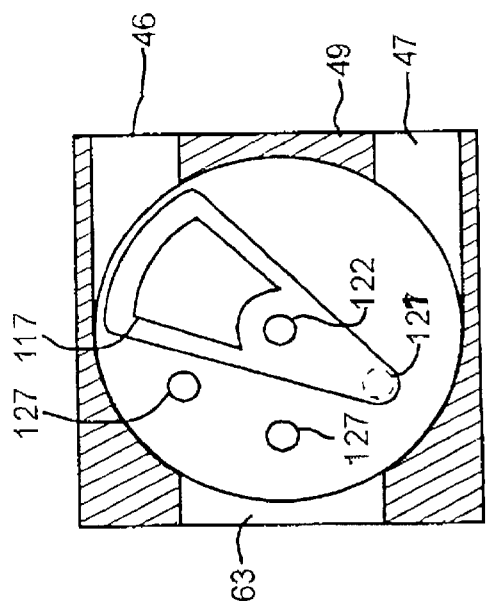
FIG. 8 is a top view partially in cross-section of the valve assembly with the rotor valve shutting off air from the first air inlet and allowing air to flow through the second air inlet.
Figure 10A:
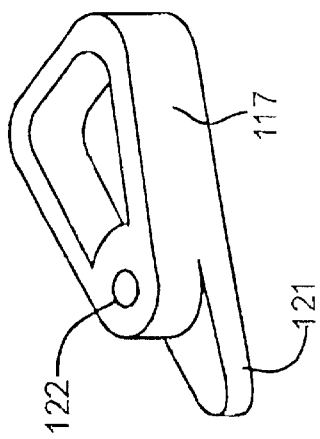
FIG. 10A is a perspective view of an alternate rotor valve.

Turning now to FIGS. 7–10C, an alternate embodiment is illustrated. In this embodiment, the housing 49 is identical to the housing of the first embodiment. However, the rotor valve 117 is wedged shaped as illustrated in FIGS. 10A–10B with the apex 121 of the wedge extending beyond the center of the wedge's radius pivot point 122. The wedge valve has a protruding top 119 similar to the wedge valve of the first embodiment and a slightly recessed shaft 120 to allow some air flow past the covered air outlet. Provided on the cover plate 111 are three light emitters 125 placed along a radius in holes 127 (see FIGS. 8 and 9). The light emitters are currently red LEDs, however other light emitters could be used. Provided on the printed circuit board are three light detectors 123 directly under the three emitters. As illustrated in FIGS. 8 and 9, the apex of the wedge will block light from the light transmitters to the detectors when the rotor valve is in the three main positions in the valve housing. Thus, the control circuit would now receive the signals from the detectors and depending on which detector is blocked by the apex of the wedge, a unique signal is generated allows for the control and timing of the rotor valve position (similar to the valve positions illustrated in FIGS. 6A–6C).

Figure 11:
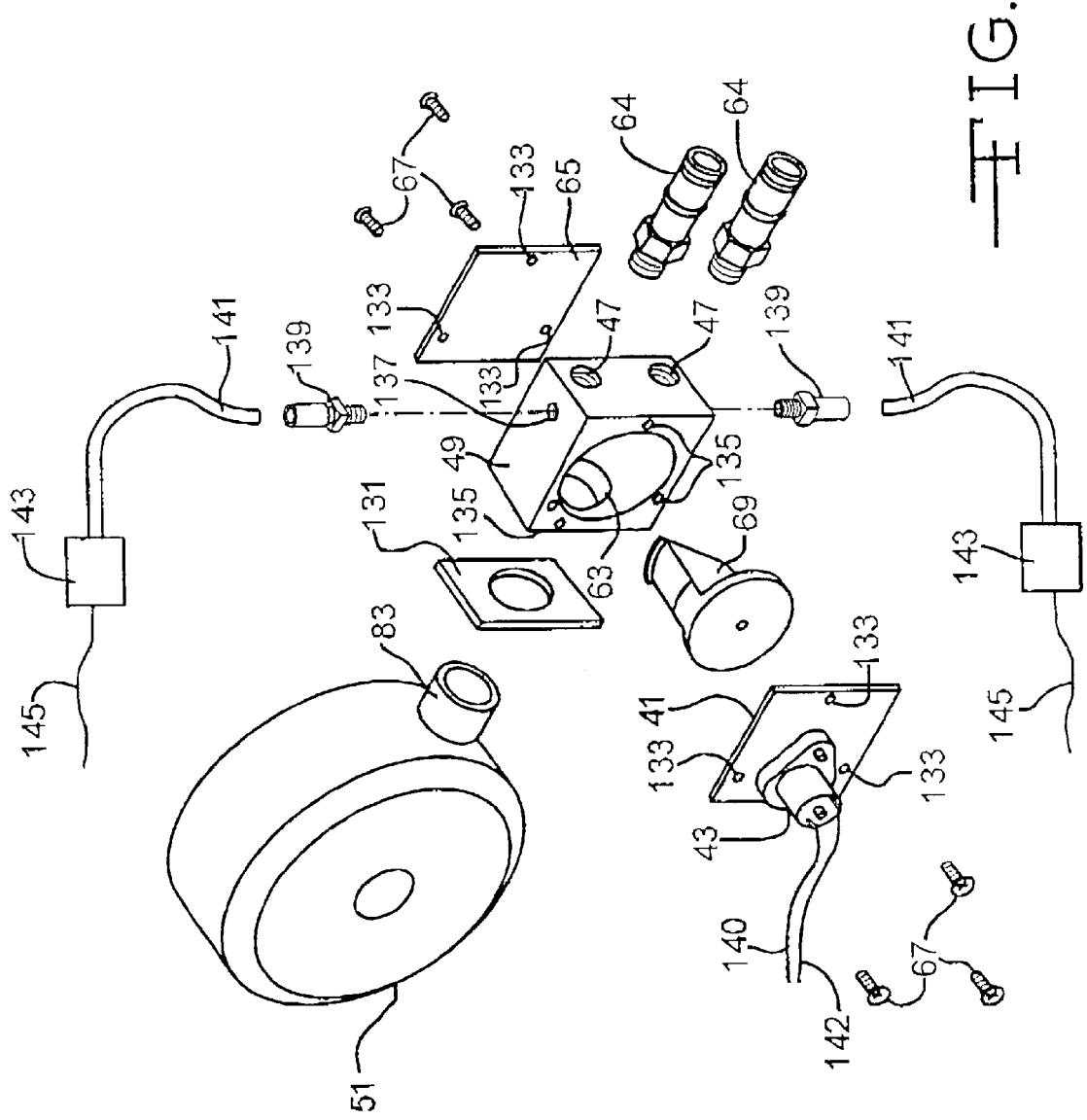
FIG. 11 is an exploded view of a further embodiment of an alternate rotor valve assembly of the present invention.

Turning now to FIG. 11, a further embodiment is illustrated as a schematic exploded view. A blower 51 with air outlet 83 is attached to a rotor valve housing 49. A gasket 131 is used between the blower and the housing to ensure a tight seal. The rotor valve 69 is controlled by an electric motor 43 which is attached to a side plate 41. The side plate is provided with a plurality of holes 133 which screws 67 pass through. The housing is provided with a plurality of threaded screw holes 135 for the screws 67 to anchor into. The electric motor is controlled by the use of leads 140 and 142, whereby switching the polarity of the leads will reverse the motor. On the opposite side of the housing from the electric motor is another side plate 65 with holes 133 for attaching to the housing using screws 67. Two threaded air outlets 47 are provided for in the housing opposite the air inlet 63. Two connectors 64 are threaded into the air outlets for connecting to the two sets of air sack within the air mattress. On the top and bottom of the housing is provided two threaded tap holes 137 where two connectors 139 are threaded into the tap holes. Two pressure hoses 141 are then connected to the connectors 139. Each pressure hose is attached to a pressure sensor 143 for sensing the relative pressure in each line. The pressure sensors are attached by leads 145 to a control box (not illustrated) similar to the box 11 of FIG. 1 wherein the pressure in each set of air sacks can be displayed. The air outlets are connected to hoses 17 and 19 (see FIG. 1) which are then respectively connected to air sacks 21 and 23. The air sacks are preferably low air loss air sacks that allow for air to flow out of small holes on the air mattress which helps the patients skin from becoming moist and prone to ulceration.

Other designs are also within the scope of this embodiment. For example, the pressure sensors could be placed anywhere along the air outlet pathway and could be placed within the air sacks themselves. Instead of using connectors 139 to attach to the pressure hoses 141, the pressure sensors could be placed directly within the tap holes 137.

The embodiment of FIG. 11 operates by first having the rotor valve 69 position half way between the air outlets 47 such that air from the blower 51 can rapidly inflate the two sets of air sacks. Once the air sacks are inflated to a certain pressure, typically in the range of 8 to 24 mm Hg, as detected by pressure sensors 143, the alternating pressure function of the invention can begin. A switch on the control box allows for the alternating pressure function. The rotor valve will then rotate to occlude one of the outlets. In the preferred embodiment, the rotor valve is sized such that most of the air will be deflected to one of the outlets, but some of the air will be allowed to flow around the rotor valve and allow air to flow into the occluded outlet. This way a differential pressure can be created between the two sets of air sacs. In the preferred embodiment, the air sacks that are occluded will have about 50–60% of the pressure in the air sacs not occluded. For example, if in FIG. 1 air sacks 21 are not occluded and air sacks are occluded, air sacks 21 may have a pressure of about 32 mm Hg, whereas air sacks 23 may have a pressure of about 17 mm Hg. The amount of pressure in the air sacks is monitored and can be adjusted depending on the needs of the patient and the comfort of the patient. If the system is attached to a low air loss mattress, then air flow is allowed all over the skin surface of the patient, even in the air sacks that are occluded by the rotor valve since some air flow is allowed around the shaft of the valve and into the occluded cells. This provides better skin therapy for the patient. Typically the pressure in the air sacks that are not occluded is controlled to about 20 mm Hg to about 35 mm Hg. The length of time one set of air sacks is occluded is also adjustable ranging from constant alternating pressure to five minutes of pressure in one set before the rotor valve rotates to occlude the other air outlet. If it is desirable to completely eliminate all pressure from one set of the air sacks, then the rotor valve can be sized such that no air is allowed to flow around it while occluding one set of air sacks.

While several particular embodiments of the invention have been illustrated and described, it will be apparent that various modifications can be made without departing from the spirit and scope of the invention. For example, different materials could be used in the different parts of the assembly. A microprocessor could be used to receive the signals from the detectors and then control the speed of the blower, the position of the rotor valve, and the duration of the rotor valve at any of the detected positions or detected pressures. Accordingly, it is not intended that the invention be limited except by the following claims.

What is claimed is:

1. An alternating pressure valve system for an alternating pressure mattress comprising:
   (a) a blower with an air intake and an air outlet;
   (b) a rotor valve assembly connected to the air outlet from the blower with the rotor valve assembly comprising:
      (1) a housing with an air intake, a first air outlet, a second air outlet, and a circular chamber for receiving the air from the air intake; and
      (2) a wedged shaped rotor valve rotatably contained within the circular chamber of the housing such that the rotor valve can rotate to block the first air outlet, block the second air outlet, or block neither air outlets; and
   (c) means for controlling the rotation of the rotor valve; wherein the rotor valve is shaped such that the top of the rotor valve completely blocks air flow to either the first or the second air outlet when the rotor valve is positioned in front of the first or the second air outlet and the shaft of the rotor valve is recessed from the circular chamber to allow for some air to flow around the rotor valve into the air outlet that is being partially blocked off by the rotor valve shaft.

2. The alternating pressure valve system of claim 1 wherein the controlling means comprises using a plurality of pressure sensors for sensing the relative air pressure at each outlet.

3. The alternating pressure valve system of claim 1 wherein the controlling means comprises using a microprocessor.

4. The alternating pressure valve system of claim 1 wherein the controlling means comprises a gearmotor to rotate the rotor valve.

5. The alternating pressure valve system of claim 4 wherein the gearmotor is controlled by printed circuit boards.

6. The alternating pressure valve system of claim 1 wherein the rotor valve blocks the first air outlet for about 0 seconds to about 5 minutes before moving to block the second air outlet.

7. The alternating pressure valve system of claim 6 wherein the rotor valve blocks the first air outlet for about 3 minutes before moving to block the second air outlet.

8. The alternating pressure valve system of claim 1 wherein the rotor valve is shaped such that the rotor valve completely blocks air flow to either the first or the second air outlet when the rotor valve is positioned in front of the first or the second air outlet.

9. The alternating pressure valve system of claim 1 wherein the blower is a variable speed blower to allow for the adjustment of the pressure inside an attached alternating pressure air mattress with faster speeds giving higher pressures and slower speeds giving lower pressures.

10. An alternating pressure valve system and mattress comprising:
   a variable speed blower with an air intake and an air outlet;
   a rotor valve assembly connected to the outlet from the blower where the rotor valve assembly comprises: a housing with an air intake, a first air outlet, a second air outlet, and a circular chamber; a wedged shaped rotor valve rotatably contained with the circular chamber of the housing such that the rotor valve can rotate to block the first air outlet, block the second air outlet, or block neither air outlets; a gearmotor connected to the rotor valve to rotate the valve from blocking the first air outlet to blocking the second air outlet;
   means for controlling the gearmotor and rotor valve to allow for different periods of time between allowing air to flow through the first air outlet and the second air outlet;
   pressure sensors for detecting the pressure at or near the air outlets connected to the gearmotor controlling means;
   means for controlling the speed of the variable speed motor to thereby control the pressure within an attached alternating pressure air mattress;
   a display to indicate the relative pressure within the alternating pressure air mattress;
   a low air loss alternating pressure air mattress connected to the first and the second air outlets such that some air to escape from the air mattress when there is air pressure within the air mattress and that alternating chambers or sacks are filled with air in the air mattress depending on the location of the wedged shaped rotor valve;
   wherein the rotor valve is shaped such that the top of the rotor valve completely blocks air flow to either the first or the second air outlet when the rotor valve is positioned in front of the first or the second air outlet and the shaft of the rotor valve is recessed from the circular chamber to allow for some air to flow around the rotor valve into the air outlet that is being partially blocked off by the rotor valve shaft.

11. An alternating pressure valve system for an alternating pressure mattress comprising:
   a variable speed blower with an air intake and an air outlet;
   a rotor valve assembly connected to the air outlet from the blower where the rotor valve assembly comprises: a housing with an air intake, a first air outlet, a second air outlet, and a circular chamber for receiving the air from the air intake; a wedged shaped rotor valve rotatably contained within the circular chamber of the housing such that the rotor valve can rotate to block the first air outlet, block the second air outlet, or block neither air outlets; a gearmotor connected to the rotor valve to rotate the valve from blocking the first air outlet to blocking the second air outlet; pressure sensors to sense the pressure at or near the first and second air outlets;
   means for controlling the gearmotor and rotor valve to allow for different periods of time between allowing air to flow through the first air outlet and the second air outlet; and
   means for controlling the speed of the variable speed motor to thereby control the pressure within an attached alternating pressure air mattress;
   wherein the rotor valve is shaped such that the top of the rotor valve completely blocks air flow to either the first or the second air outlet when the rotor valve is positioned in front of the first or the second air outlet and the shaft of the rotor valve is recessed from the circular chamber to allow for some air to flow around the rotor valve into the air outlet that is being partially blocked off by the rotor valve shaft.

12. The alternating pressure valve system of claim 11 wherein the pressure sensors determine the position of the rotor valve.

13. The alternating pressure valve system of claim 11 wherein the rotor valve blocks the first air outlet for about 0 seconds to about 5 minutes before moving to block the second air outlet.

14. The alternating pressure valve system of claim 13 wherein the rotor valve blocks the first air outlet for about 3 minutes before moving to block the second air outlet.

15. The alternating pressure valve system of claim 11 wherein the rotor valve is shaped such that the rotor valve completely blocks air flow to either the first or the second air outlet when the rotor valve is positioned in front of the first or the second air outlet.

16. The alternating pressure valve system of claim 11 wherein the means for controlling the gearmotor comprises a microprocessor.

17. The alternating pressure valve system of claim 11 wherein the means for controlling the gearmotor comprises printed circuit boards.

* * * * *